(12) United States Patent
Young

(10) Patent No.: US 6,851,394 B1
(45) Date of Patent: Feb. 8, 2005

(54) BOOT AND HARNESS SWIMMING SYSTEM FOR AN ANIMAL

(76) Inventor: Christopher S. Young, 15 Hidden Meadow La., South Kent, CT (US) 06785

( * ) Notice: Subject to any disclaimer, the term of this patent is extended or adjusted under 35 U.S.C. 154(b) by 0 days.

(21) Appl. No.: 10/271,648

(22) Filed: Oct. 16, 2002

(51) Int. Cl.$^7$ .............................................. A01K 13/00
(52) U.S. Cl. ........................................ 119/850; 54/82
(58) Field of Search .................... 36/3 A, 6.3, 7.5, 36/7.6, 4; 119/850; 168/4; 54/92; D30/144–146

(56) References Cited

U.S. PATENT DOCUMENTS

| | | | |
|---|---|---|---|
| 2,424,172 A | * 7/1947 | Huddleston | 36/111 |
| 3,671,987 A | * 6/1972 | Mayor | 441/61 |
| 3,879,865 A | * 4/1975 | Kimball | 36/7.3 |
| 4,633,817 A | 1/1987 | Taylor | 119/969 |
| 4,744,333 A | 5/1988 | Taylor | 119/96 |
| 5,148,657 A | 9/1992 | Stafford et al. | 54/82 |
| 5,408,812 A | 4/1995 | Stark | 54/82 |
| 5,495,828 A | * 3/1996 | Solomon et al. | 119/850 |
| D375,586 S | 11/1996 | Caditz | D30/146 |
| D376,448 S | 12/1996 | Caditz | D30/146 |
| D379,251 S | * 5/1997 | Mezey | D30/146 |
| D417,530 S | 12/1999 | Danek | D30/146 |
| 6,408,540 B1 | * 6/2002 | DeKalb et al. | 36/8.1 |
| 6,470,599 B1 | * 10/2002 | Chu | 36/113 |
| 6,470,832 B1 | * 10/2002 | Peacock | 119/850 |

FOREIGN PATENT DOCUMENTS

FR           2612048 A1 * 9/1988       ........... A01L/7/00

* cited by examiner

Primary Examiner—Teri P. Luu
Assistant Examiner—Kimberly S Smith
(74) Attorney, Agent, or Firm—Carmody & Torrance LLP

(57) ABSTRACT

A boot and harness swimming system for use by a dog in a swimming pool. The boots are placed on the paws of the dog and a harness is used across the dog's back to maintain the boots on the dog's paws. The boot has specific features such as a drain aperture and a concave bottom surface to appreciate the needs of a boot designed for swimming. A specifically designed floatation device for the animal's back is also provided.

7 Claims, 3 Drawing Sheets

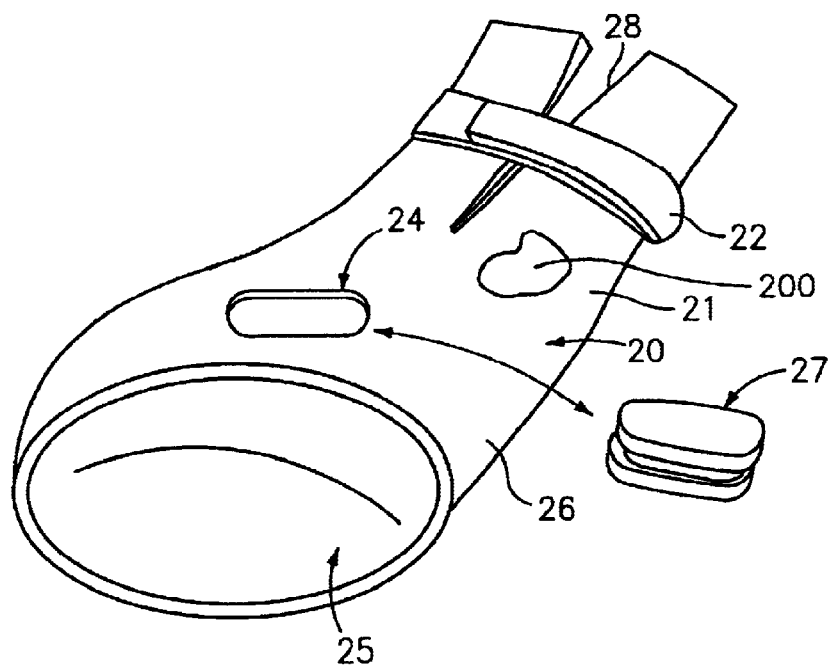
FIG. 3
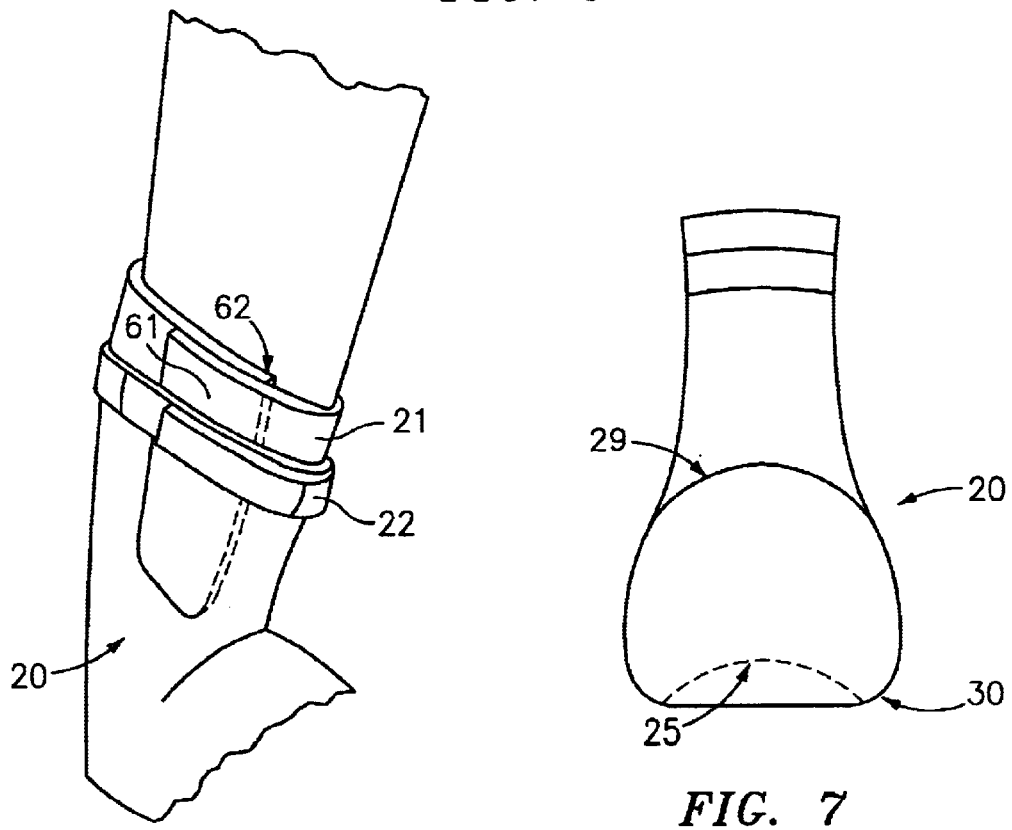
FIG. 6
FIG. 7

BOOT AND HARNESS SWIMMING SYSTEM FOR AN ANIMAL

BACKGROUND OF THE INVENTION

The present invention relates generally to boots for animals and in particular, to an improved boot and harness swimming system for use by an animal, preferably a dog, in a swimming pool.

Animal lovers, such as dog lovers, get significant enjoyment from engaging and playing with their pets. One source of significant enjoyment is playing with their dogs in the water. Almost everyone at one time or another has watched a dog run along a beach and into the surf. Swimming in a lake, pond or ocean by a dog is quite easy as the dog merely does what comes naturally.

Unfortunately, dogs are not often welcome in swimming pools due to the likelihood that their sharp nails on their paws will scratch people in the pool and/or otherwise damage the pool liner.

The inventor herein is unaware of any boot that can be worn by an animal, and preferably a dog, that effectively protects both the people in the pool playing with the dog and the swimming pool liner, and also simultaneously minimizes the inconvenience or uncomfortableness to the dog. Moreover, the inventor is unaware of any boot that effectively permits the dog to swim with minimal restraints on its own natural swimming motion. Moreover, the prior art is deficient in effectively maintaining the boots on the dog's paws while the dog is swimming or otherwise just standing in the pool.

The prior art appears to contain examples of protective footwear for dogs related to the cold, examples of which are illustrated in U.S. Pat. Nos. 4,633,817; 4,744,333 and 5,148,657. Other examples of dog boots are described and illustrated in U.S. Pat. Nos. 5,408,812; D375,586; D376,448 and D417,530. As can been seen therein, none of the prior art appear adaptable for use in swimming, as disclosed and claimed herein.

Therefore, the prior art is completely deficient in recognizing or overcoming the perceived deficiencies set forth above.

Accordingly, it is desirable to provide an improved boot and harness swimming system that permits an animal, and preferably a dog, to swim as naturally as possible in a swimming pool while simultaneously protecting both people in the pool that are playing with the dog and the pool itself from damage. The present invention overcomes the perceived deficiencies in the prior art and further achieves the aforementioned and below mentioned objectives.

SUMMARY OF THE INVENTION

Generally speaking, in accordance with the present invention, a boot and harness swimming system for an animal, preferably a dog, is provided. In a preferred embodiment, the swimming system comprises a first boot for accommodating a first right side paw of the animal; a second boot for accommodating a first left side paw of the animal; and a harness member coupled to each of the first and second boots and intermediate therebetween, wherein a section of the harness member intermediate the first and second boot is positionable over the back of the animal; wherein when the harness member is positioned over the back of the animal and the first right side paw and the first left side paw are placed in the respective first and second boots, the harness member inhibits the first or the second boot from being removed from the respective first right side or first left side paw.

Preferably, a second harness member is used in connection with third and forth boots on the other of the dog's paws. In one embodiment, a coupling strap is provided for coupling the first harness member to the second harness member. In another embodiment, the first harness member and the second harness member crisscross across the back of the animal. In yet a third embodiment, the harness members may be coupled to the same side boots, with one or more coupling straps for coupling the first and second harness members, wherein the coupling straps extend across the animal's back and orthogonal to the spine thereof.

In particular features of the invention, the boots may include an aperture through a sidewall of the boot, wherein the aperture is located to permit water to drain therefrom. Additionally, the bottom surfaces of the boots may be concave to facilitate movement in the water. The boot is also shaped to facilitate in the animals swimming motion. The system may also contain a floatation device secured to the animal's back to facilitate buoyancy and/or swimming.

Accordingly, it is an objective of the present invention to provide an improved boot and harness swimming system for an animal, preferably a dog, that can be used by the animal while in a swimming pool.

Another objective of the present invention is to provide an improved boot and harness swimming system for an animal, preferably a dog, that can be used by the animal in a swimming pool while also being able to protect the swimming pool liner.

Another objective of the present invention is to provide an improved boot and harness swimming system for an animal, preferably a dog, that can be used by the animal in a swimming pool while also being able to protect those people playing with the dog in the pool.

Yet another objective of the present invention is to provide an improved boot and harness swimming system for an animal, preferably a dog, that can facilitate swimming by the animal.

Yet another objective of the present invention is to provide an improved boot and harness swimming system for an animal, preferably a dog, that can assist in the floatation of the animal in the water.

Still another objective of the present invention is to provide an improved boot and harness swimming system for an animal, preferably a dog, that is minimally restrictive to the animal (i.e. relatively comfortable to wear).

Yet another objective of the present invention is to provide an improved boot and harness swimming system for an animal, preferably a dog, that allows for the drainage of water once the animal comes out of the water.

In yet another example, the material used for the harness members, such as elastic, can also be used allow the present invention to be used to exercise the animals' limbs.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying figures, in which:

FIG. 3 is an enlarged view of an exemplary boot preferably used in connection with the swimming systems illustrated in FIGS. 1 and 2;

FIG. 6 is a perspective view of a specific embodiment and feature of the boot that provides for an improved reduction of water in the boot; and FIG. 7 is a front perspective view of a specific construction of the boot that facilities the animal in swimming.

Like parts will be identified by like reference numbers in the figures, but not every part will be provided with a reference number, and this should not be construed in a limiting manner.

DETAILED DESCRIPTION OF THE PREFERRED EMBODIMENTS

Figure 1:
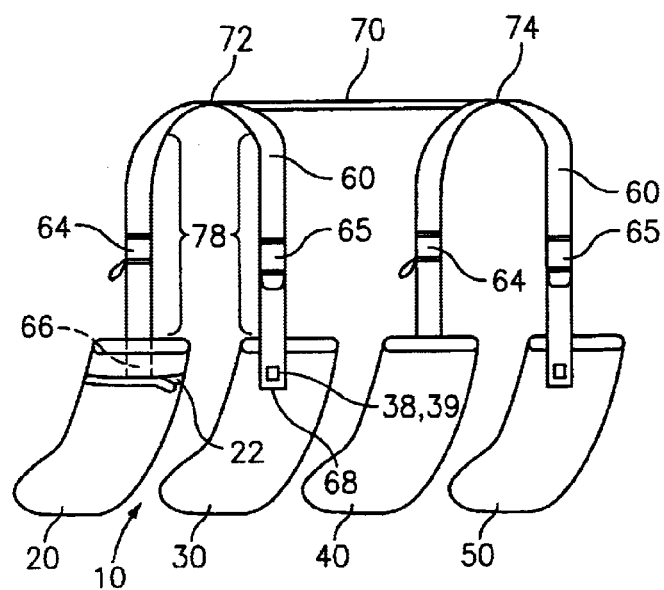
FIG. 1 is a perspective view illustrating a boot and harness swimming system of a first embodiment and constructed in accordance with the present invention.

Reference is first made to FIG. 1 wherein a swimming system, generally indicated at 10, constructed in accordance with a first embodiment of the invention and intended for use by an animal, such as a dog, is disclosed. Swimming system 10 preferably comprises at least one or more boot and harness arrangements as disclosed more specifically below.

It should be understood that the invention is not limited to dogs, and should not be construed to be limited as such. However, the invention has been constructed most preferably to be used by a dog, and therefore, reference to a dog shall be used hereinafter. However, the claims are not limited thereby.

As illustrated in FIG. 1, and generally speaking, swimming system 10 comprises at least one and preferably two, boot and harness arrangements, each of which shall now be disclosed. In the first contemplated embodiment, a first boot and harness arrangement in system 10 comprises a first boot for accommodating a first right side paw of the dog, a second boot for accommodating a first left side paw of the dog, and a harness member coupled to each of the first and second boots and intermediate therebetween.

In this first embodiment, the first boot may be generally designated boot 20 for accommodating the front right side paw and the second boot may be generally designated boot 30 for accommodating the front left side paw. In this embodiment, the harness member is designated by reference numeral 60, and can be seen to include a section (illustrated by reference numeral 62) that is intermediate first boot 20 and second boot 30.

All the harness members disclosed herein may be made of a variety of materials, such as elastic or nylon for example. As illustrated, a portion of section 62 is positionable over the back of the dog (see the exemplary dog in FIG. 5). When harness member 60 is positioned over the back of the dog and the first right side front paw and the first left side front paw are placed in the respective first boot 20 and second boot 30, harness member 60 assists in preventing the first boot 20 or second boot 30 from being removed from the respective first right side front paw or first left side front paw. The term "section" shall be understood to mean both the portion of the harness member intermediate the boots and the section that is on top of the dog's back. In this way, one need not refer to a "portion of the section" or similar redundant terminology.

To further provide this feature, harness member 60 may have one or more buckles 64, 65 that permit for the adjustment of the length of the harness member 60. This feature maintains the proper tautness in the harness member and can operate similar to a seatbelt buckle or the like, as would clearly be understood in the art. However, because of the natural walking or swimming motion of the dog, motion restriction is minimized.

While obvious from the present disclosure, but for purposes of completeness, it should be understood that a second boot and harness arrangement is preferably used in system 10 and would preferably comprise a third boot 40 for accommodating the rear right side paw and a fourth boot 50 for accommodating the rear left side paw. A similar harness member 60 is provided, along with similar buckles. The buckles could also be similar to those found on a belt or other adjustable type strap member.

In this embodiment, a harness member coupler, such as a strap 70, can be used to extend between the first and second harness members 60, 60 for maintaining the alignment of harness members 60, 60 over and in position on the back of the dog. Of course, one or more straps can be used, and may be used on the sides of the dog (i.e. along the dog's ribs) as well. Strap 70 may be coupled to each of the harness members 60 by use of stitching, Velcro or other connecting or buckling mechanisms, including merely passing members 60 through a loop (not shown) at the ends of strap 70, all being within the purview of one skilled in the art. Mating Velcro patches 72, 74 are shown as the exemplary coupling mechanism.

Figure 2:
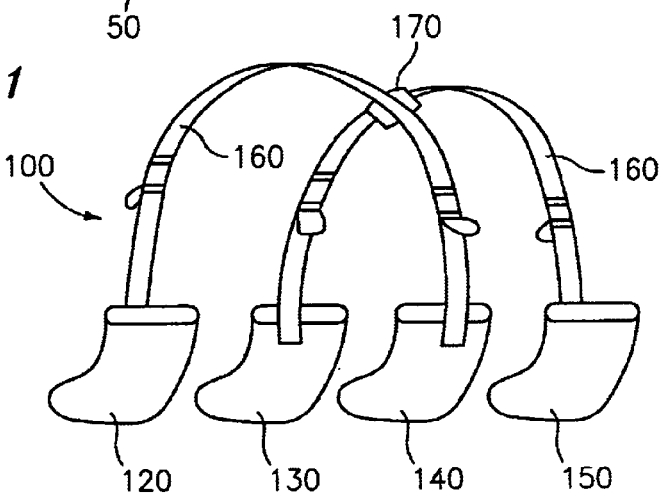
FIG. 2 is a perspective view illustrating the swimming system constructed in accordance a second embodiment of the present invention.

Reference is briefly made to FIG. 2 which illustrates yet a further embodiment of the present invention, reference being made generally to system 100 which also comprises one or more boot and harness arrangements more particularly disclosed below.

Specifically, in this embodiment each arrangement comprises a first boot generally designated 120 for accommodating the front right side paw and a second boot generally designated 140 for accommodating the rear left side paw. The harness member is designated by reference numeral 160. In all other respects (other than the angled alignment across the dog's back) the harness member 160 is similar to harness member 60. The second boot and harness arrangement in system 100 is similar in that a third boot generally designated 150 accommodates the rear right side paw and a fourth boot generally designated 130 accommodates the front left side paw. Likewise, a similar harness member 160 is employed. Here it can be seen that when the respective boots are fitted on the dog, the first and second harness members 160, 160 would crisscross across the back of the animal.

A buckle, hook, mating Velcro pads or other coupling member 170, can be used at the criss-cross intersection of the first and second harness members 160, 160 to maintain their alignment and position on the back of the dog.

Reference will now be made to the disclosure of the preferred coupling of the harness members 60 or 160 to the respective boots. For brevity, reference will be made to harness member 60 and boots 20, 30, it being understood that harness member 60 and its respective coupling to boots 40, 50 and harnesses 160 and their respective coupling to boots 120, 140 and 130, 150 is constructed similarly. Reference shall also be made to the selected boot in FIG. 3, it being understood that all the boots being constructed similarly.

Preferably, harness member 60 has a first end 66 coupled to first boot 20 and a second end 68 coupled to second boot 30. First and second ends 66, 68 may be coupled to its respective boot in a plurality of ways, such as by stitching or sewing the respective ends 66, 68 to the outer surface of the respective boot. The respective ends may also be coupled to the outer surface of the boots by mating Velcro pads 38, 39 (see boot 30 in FIG. 1 for such an illustration). The ends of the harness member may also be coupled to the respective boots by some other acceptable attachment means, such as glue or the like. Alternatively, a strap, such as that designated by strap 22 and illustrated in FIG. 1 as being on boot 20, and more specifically, on the preferred boot illustrated in FIG. 3, may be used to couple an end of the harness member 60 to the boot, such as boot 20. A securing method, such as the aforementioned Velcro, can be used to tighten strap 22 around the ankle portion of the boot, while end 66 is secured between the strap and the outer surface of the boot, or directly against the boot itself. Strap 22 may also have a mating Velcro pad on the outer surface thereof so as to simply provide a region to which the mating pad on the end 66 is coupled. In this way, harness member 60 may be releasably detached from boots 20, 30 for easy cleaning or storage, for example.

The disclosures of U.S. Pat. Nos. 4,633,817; 4,744,333 and 5,148,657; 5,408,812; D375,586; D376,448 and D417,530 are incorporated by reference as if fully set forth herein for their descriptions of the straps and other features that may be appreciated and used in connection with the present invention, and for the materials used to comprise such features, such as the straps.

Of course, each second end 68 of each harness member 60 may be coupled to a boot in a manner similar to any of those disclosed above (it should be noted that boots 20 and 30 show different manners in which the ends of the harness member 60 are coupled thereto, but this is merely to illustrate different examples of satisfactory mating alternatives.). In the preferred embodiment, all the mating means are the same.

Turning now to FIG. 3 and a preferred construction of the boot itself (boot 20 being shown for illustrative purposes only), it is envisioned that each boot is made of soft molded rubber or other material that may provide for lightweight and be non-water absorbing, although this is by way of example, and not limitation. If desired each of the boots may include an inner lining material (shown by reference numeral 200 in the cutaway portion of the boot) for providing additional warmth, shock absorbing or comforting advantages. The surface of the boots should be made as smooth as possible to reduce drag in water.

Another advantageous feature of the present invention is the incorporation of a concave bottom surface 25 of the boot itself. A concave bottom surface facilitates the movement (i.e. swimming) of the dog in the water, similar to the "cupping" of ones hand. In this way, the dog may more easily propel itself through the water. It can be seen that boot 20 comprises an ankle/calf portion 21 and a foot portion 26 with bottom surface 25. Lining or padding may be provided in the boot so the dog docs not feel the concavity. For clarity, it should be understood that strap 22 is preferably located on the ankle/calf portion 21 of boot 20. Furthermore, a slit 28 may be provided in upper portion of ankle/calf portion 21 of boot 20 to facilitate the putting on and taking off of the boot. Again, all the boots are preferably constructed similarly.

To illustrate yet another preferred boot construction, reference is made to FIG. 6, wherein an alternate ankle/calf portion 21 is illustrated. Here, portion 21 may include overlapping flaps 61 and 62. Preferably, these overlapping flaps most effectively allow the boots to conform to varying circumferences of an animal's leg. The closeness of the boot material to the leg, and hence the utilization of the construction of this FIG. 6, advantageously advances the state of the art in helping to prevent water from getting in the boot while the animal is wearing the boot in the water. Clearly, the dotted lines in FIG. 6 illustrate the portion of flap 62 that is between the animals' leg and outer flap 61. It is also contemplated that the actual material used to construct the boot may be thinner as one moves towards the flaps 61 and 62 to facilitate a close fitting wrapping of the boot around the ankle/calf portion of the leg.

That is, generally speaking, the boot comprises a foot portion and an integrally molded ankle/calf portion; wherein the foot portion comprises rounded toe section to reduce drag in the water as the animal's leg is making an upward stroke therein; and wherein the foot portion comprises an inwardly sloping rounded corner that is intermediate a side wall of the foot portion and the bottom surface of the boot for additional reduction of drag in the water, and wherein the ankle/calf portion includes a first flap and a second, overlapping flap, such that when the boot is on the animals paw, the second, overlapping flap overlaps and is securable against the first flap so as to minimize the spacing between the ankle/calf portion and the animals leg thereby reducing the flow of water into the boot when the boot is on the animals leg and the leg is in the water, and wherein the second overlapping strap is secured against the first flap.

Also, a variety of means can be used to secure the second, overlapping flap 61 to the first flap 62, such as use of complementary Velcro patches (not shown) on the inner surface of flap 61 and outer surface of flap 62, and/or an entire strap, such as strap 22 can be used to snugly secure the flaps in an overlying fashion.

Still another feature of the present invention is to provide each boot with an aperture, designated by reference number 24. Aperture 24 extends through the material that comprises the sidewall of the boot and provides an outlet through which water can drain. It should be clear therefore that aperture 24 is located towards more towards foot portion 26 to provide for maximum drainage. A plug 27 can be used in cooperation with aperture 24 to "plug-up the aperture when the animal is using the boots for warmth, protection (i.e. in the woods) or merely walking. Plug 27 can be provided in many forms, such as a rubber plug as one would find for a cork to seal a bottle, a screw-in plug, or a rubber plug similar to those found on old piggy banks, all being within the purview of one skilled in the art.

In a similar way, the bottom 25 of the boot may be porous or contain one or more apertures to serve this drainage purpose. One skilled in the art would clearly know how to provide for such a feature, such as during the molding or manufacturing process thereof.

Still further, it can be seen and is a feature of the present invention to provide a boot that facilitates swimming. Reference is now made to FIG. 7. Preferably, boot 20 has a very large dramatically bulbous front toe section 29 to reduce drag when the dog's leg is making its upward swimming stroke in the water. Likewise, a rounded bottom corner 30 preferably slopes inwardly to still further reduce drag when the dog's leg is making its upward swimming stroke in the water. The use of an inwardly rounded corner and large bulbous toe region also assists in protecting the people that may come in contact with the dog's paws in the water and also protects the pool liner from being cut.

It should be understood that the features and advantages discussed above and illustrated in FIGS. 6 and 7 can be utilized in the embodiments of FIGS. 1–5. That is, the different features therein complement the functionality shown in the remaining figures.

Figure 4:
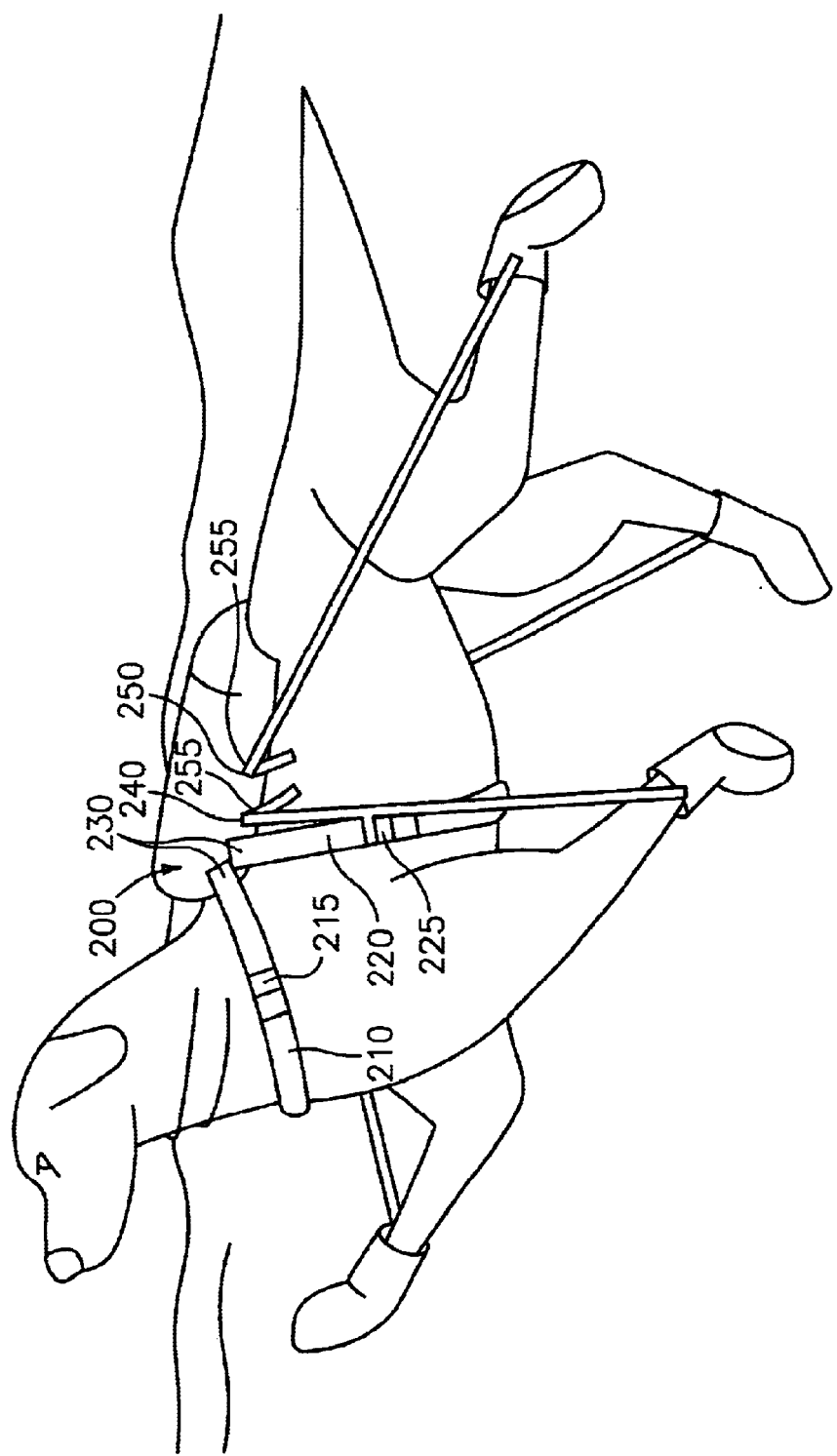
FIG. 4 is a perspective view illustrating yet another boot and harness swimming system embodiment of the present invention.

Reference is now made to FIG. 4 for a description of an alternative embodiment of the present invention, wherein the incorporation of a floatation device 200 can be incorporated into the system. Floatation device 200 can be made of any material to provide for the buoyancy of a person, and is well known in the art. The shape is preferably elongated with a concave shape to more easily conform to the shape of the animal's, or dog's back. An adjustable neck strap 210 with an adjusting buckle 215 and a similarly configured chest strap 220 with adjusting buckle 220 can be used in combination to assist in securing the floatation device 200 to the dog's back. Such straps may have buckles or other well known means to adjust the tightness thereof. Slots 230 may be provided through floatation device 200 (on both the near and far (not shown) sides) to allow for the straps 210, 220 to pass therethrough to the other side of the dog.

It is anticipated that floatation device 200 will be used together with the harness and boots of the earlier disclosed embodiments. As such, slots 240, 250 can provide the necessary way to have the harnesses 60, 160 pass therethrough to the far side (not shown) of the dog. In another embodiment, each paw/boot may have its own individual harness strap. In this event, each harness strap is merely individually secured to floatation device 200. This can be achieved by mating Velcro pads, a buckle, a loop with an adjustable buckle, stitching or other adhesive means. Adjustability (i.e. adjusting the length) would be therefore provided by individual adjustability mechanisms such as those disclosed above by reference numbers 64 and 65 or other buckle arrangements.

For completeness, reference number 255 is intended to denote a suitable connection of the harness straps shown in FIG. 4 when they are deemed to be all individually connected (i.e. independent harness straps). As such, number 255 is intended to disclose and illustrate a buckle, Velcro pads, a loop/buckle, stitching, sewing or other adhering method. Accordingly, all the claimed features are clearly illustrated. All other features not discussed in FIG. 4, such as the boots and harness arrangements, are deemed to be available in this embodiment and correspond to those features shown in FIGS. 1–3. Specific reference thereto has only be omitted for purposes of brevity. For example, FIG. 4 is deemed to disclose adjustment features similar to those corresponding to numbers 64, 65 (FIG. 1) and is also deemed to disclose and incorporate all the feature of the boots and harness attachments.

It can thus be seen that FIG. 4 can be seen to disclose both the embodiment wherein (i) the harness members pass through the floatation device through slots to the far side of the dog and (ii) wherein the flotation device is secured to the dog by a plurality of individual harness straps, four in this example, all individually secured to the floatation device. A combination of both embodiments is also contemplated herein.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

Figure 5:
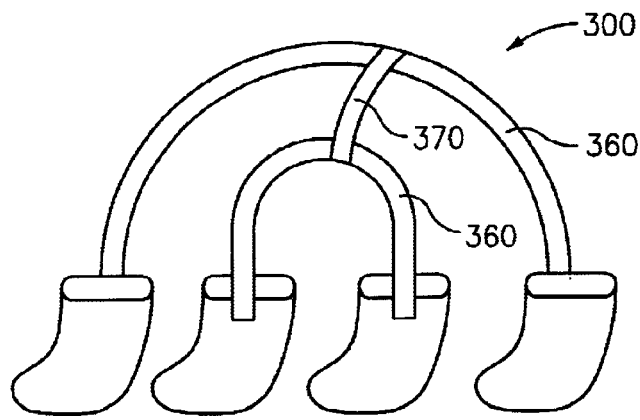
FIG. 5 is a perspective view of yet another embodiment constructed in accordance with the present invention.

Lastly, so as to provide the broadest disclosure and protection, it should be noted that the embodiment of FIG. 5 is also contemplated herein. Specifically, in system 300, each harness member 360 is connected to both respective right side or left side boots. One or more coupling straps 370 are employed for maintaining the tautness and the boots on the respective paws. In all respects, the boots of this FIG. 5 and the harness members thereof are made similarly to those described above. Coupling strap(s) 270 can also be connected using the alternative coupling mechanisms disclosed above. It should also be seen that the features of this embodiment can be incorporated into the embodiment of FIG. 4 and visa versa, with the only modifications being the strap connections and corresponding slit configuration on floatation device 200. All of these modifications can be understood and achieved by the teachings herein.

A boot and harness swimming system as disclosed herein provides animal lovers, and particularly dog lovers, with significant enjoyment from being able to play with their dogs in a swimming pool with the reduced or even eliminated fear that the dog's sharp nails on their paws will scratch the people in the pool and/or otherwise damage the pool liner. Moreover the boot and harness swimming system as disclosed herein effectively protects the swimming pool liner and minimizes the inconvenience or uncomfortableness to the dog. Moreover, the present invention only minimally, if at all, restrains the dog from its own natural swimming motion. Still further, the boot and harness swimming system as disclosed herein effectively maintains the boots on the dog's paws while the dog is swimming or otherwise just standing in the pool. Also, using the floatation device disclosed herein assists the animal in floating or swimming. Further, the present invention provides a unique and effective way to provide for water drainage once the animal comes out of the water. Still further, the present invention with its use of elastic harness members can be used to provide resistance to the dog's paws/legs, thereby providing a method/means to provide exercise to the dog.

It is also to be understood that the following claims are intended to cover all of the generic and specific features of the invention described herein and all statements of the scope of the invention that as a matter of language might fall therebetween.

What I claim is:

1. A boot for a boot and harness swimming system for an animal, the boot comprising:

a foot portion; said foot portion comprising a concave bottom surface, wherein said concavity of said bottom surface extends over substantially the entire bottom surface of the boot;

an integrally molded ankle/calf portion;

an aperture and associated plug for releasable securing within the aperture, wherein the aperture extends through a sidewall of the boot, and wherein the aperture provides an outlet rough which water can drain when the plug insert is not in the aperture and wherein the plug inhibits water from exiting and entering the boot when inserted therein.

2. The boot as claimed in claim 1, wherein the boot further comprises an inner lining.

3. A boot for a boot and harness swimming system for an animal, the boot comprising:

a foot portion and an integrally molded ankle/calf portion;

wherein the foot portion comprises a rounded toe section to reduce drag in the water as the animal's leg is making an upward stroke therein; and wherein the foot portion comprises an inwardly sloping rounded corner that is intermediate a side wall of the foot portion and a bottom surface of the boot for additional reduction of drag in the water; and wherein said foot portion further comprises a concave bottom surface, wherein said concavity of said bottom surface extends over substantially the entire bottom surface of the boot.

4. The boot as clamed in claim 3, wherein the ankle/calf portion includes a first flap and a second flap, said second flap overlapping said first flap to minimize the spacing between the ankle/calf portion and the animal's leg thereby reducing the flow of water into the boot when the boot is on the animal's leg and the leg is in the water; and wherein the overlap of the second flap over the first flap is secured by securing means.

5. The boot as claimed in claim 4, wherein the securing means comprises complementary patches of fastening tape or an overlying strap.

6. The boot as claimed in claim 3, wherein the boot further comprises an inner lining.

7. A boot for a boot and harness swimming system for an animal, the boot comprising:

a foot portion; said foot portion comprising a concave bottom surface, wherein said concavity of said bottom surface extends over substantially the entire bottom surface of the boot; and an integrally molded ankle/calf portion;

at least one aperture to provide an outlet through which water can drain; and an associated plug for releasable securing within the at least one aperture, wherein the plug inhibits water from exiting and entering the boot when inserted therein.

* * * * *